United States Patent Office 2,964,352
Patented Dec. 13, 1960

2,964,352

DEVICE FOR INFLUENCING THE CURRENT ABOVE THE TOP OF A MOTOR VEHICLE

Johannes Werner, Wilhelm-Leuschner Strasse 33, Offenbach (Main), Germany

Filed May 7, 1958, Ser. No. 733,594

7 Claims. (Cl. 296—91)

This invention relates to motor vehicles having sliding roof panels or "sunshine roofs."

It is known that discomforting eddies affect passengers in motor vehicles having opened roof panels. Air deflectors of different types have been proposed and constructed to remedy this situation. These deflectors have been either connected to the front edge of the opening or arranged across the opening. Although these wind deflectors are relatively wide and generally from 2½ inches to 7½ inches, experience has shown that they are not sufficient to screen off the back seats of such vehicles. Two or more of these wide air deflectors have also been arranged in the openings of such tops without a marked increase in efficiency.

Special difficulties are encountered in motor vehicles, the windshield of which is overhung by a projection which is a forward extension of the top of the windshield. The damming of air flowing upwardly over such a windshield causes unpleasant and substantially uncontrollable eddies which, when a roof panel is opened, not only bring about strong eddies that molest passengers, but which, even when the panel opening is closed, exert such a strong suction that a disturbing noise may be caused.

It is an object of the invention to influence air currents above the roofs of motor vehicles having sliding roof panels by the provision of simple devices which, even in motor vehicles with forwardly projecting tops, prevent disturbing noises when the panel opening is closed and further prevent air eddies from molesting the passengers when the panel opening is open.

In order to achieve this purpose, the invention provides for a transverse ledge, about six-tenths of an inch in width and therefore considerably narrower than known deflectors, said ledge being arranged so that impinging air is divided into upper and lower portions and continues its flow having been thus deflected.

A flow converting ledge, according to the invention, preferably has an open channel section, the open side of which runs approximately perpendicular to the impinging current. For example, a transverse ledge according to the invention arranged approximately three-quarters of an inch above the front edge of a top projection may preferably have the cross-section of a semi-circle of about six-tenths of an inch in diameter.

Such a flow converter ledge made, for example, of chromium plated metal is preferably rigidly fixed in its position relative to the vehicle. It extends substantially in a length corresponding to the width of the opening in the vehicle roof, is inconspicuous and requires no more space than any of the usual ornamental ledges or moldings. It does not require the attention of the driver, since it constantly remains in its position, nor does it impair the view, since it is disposed above the fixed portion of the roof and at a small distance from the same.

A preferred embodiment of the invention is described in connection with the accompanying drawing, in which.

Although the theoretical flow of air along the windshield and over the top of a motor vehicle with and without a flow converter ledge according to the invention is not exemplified in detail, the figures indicate the course of the main currents. Constructions of the invention do not depend on the minor details of the flow. Rather, the invention is concerned with the fact that an arrangement of a flow converter ledge can so influence flow over the top of a motor vehicle that practically all disturbances are avoided; i.e., both the disturbing noise when the panel is closed and the air eddies which molest passengers when the panel is open.

Figure 1:
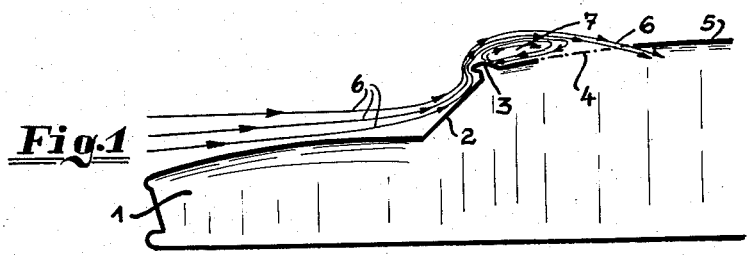
Fig. 1 shows a central longitudinal section through the front portion of a car body with a rigid, collapsible or other type of roof panel and a protrusion projecting beyond the windshield, but without a flow divider rail according to the invention.

Fig. 1 shows the central longitudinal section of a radiator cover 1, a windshield 2, a top projection 3, a panel opening 4 capable of being closed by a sliding panel (not shown), and a fixed top or roof portion 5 of a car body located at the rear of the opening 4.

The arrows 6 indicate the course of the flow. The flow 6 is deflected upwardly from the top projection and subsequently forms a strong eddy 7 above the opening 4. This eddy 7 which is due to the flow being interrupted causes the air in the passenger space to be whirled about when the top is open, resulting in a substantial suction effect beneath the opening 4 and a strong pressure effect at the rear portion of the passenger space.

Figure 2:
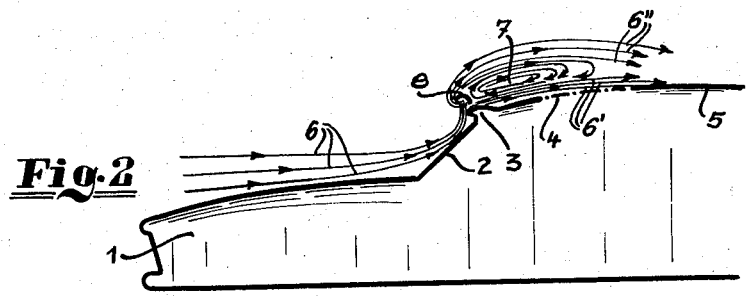
Fig. 2 shows the same view as Fig. 1 but with a flow converter ledge according to the invention.
Figure 3:
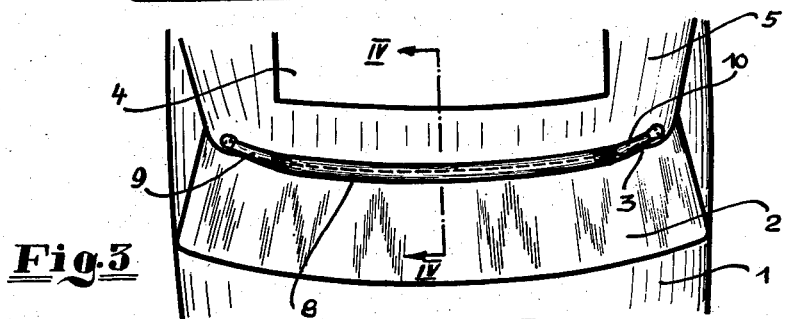
Fig. 3 is a top view of a central portion of the car body of Fig. 2.

Fig. 2 is a view similar to Fig. 1 with the difference, however, that a flow converter ledge 8 is arranged above the projection 3 of the top. As indicated by Fig. 3, the ledge 8 extends transversely over the entire width of the opening 4. Its extended ends 9 and 10 are rigidly fixed to the projection 3.

Figure 4:
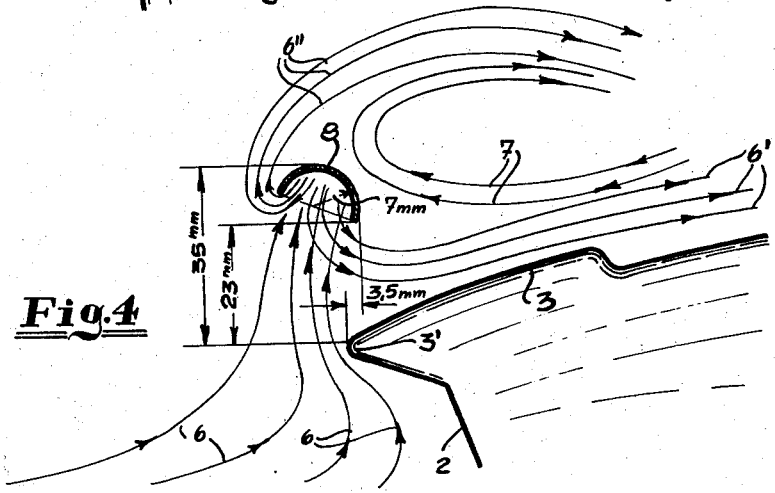
Fig. 4 is an enlarged section taken along the line IV—IV of Fig. 3.

Fig. 4 shows an enlarged cross section of the ledge 8 in its position relative to the projection 3 of the top. The ledge 8 is, for example, made of chromium plated steel and has a semi-circular or arcuate hollow cross section with a radius of 7 mm. The concave side of the ledge extends obliquely forwardly and downwardly, so that the air flowing upwardly on the windshield 2 and damming up against the projection 3 is at least partly intercepted by the ledge 8 and flows toward the back in two partial streams 6' and 6" flowing above and below the ledge. Of special importance within the scope of this invention is the lower stream 6' of these compressed partial streams which flow along with increased velocity. This lower stream 6' causes a substantially laminar flow along the top of the vehicle and toward the back, so that the disturbing eddy 7 is compensated for or can at least no longer take effect directly above the sliding top or the opening 4.

As can be seen from the dimensions given in Fig. 4, the distance of the flow converter ledge 8, having a diameter of 14 millimeters from the front edge of the projection 3 is about 23 millimeters; the back edge of the ledge 8 is about 3.5 millimeters behind the front edge 3' of the projection 3, and the ledge 8 is located within a distance of 35 millimeters above the front edge 3'.

The surprising effect of practically undisturbed air even above the top of the vehicle is thus obtained by a relatively graceful, inconspicuous additional device which does not interfere with the view and which may be detachably but preferably rigidly mounted on the vehicle. This represents a substantial technical advance over known wind deflectors. This is particularly so since the formation of eddies on motor vehicles with projecting attachment 3 of the top is so strong that known wind deflectors are put under pressure from the rear and are, therefore, completely useless or are even carried away by the air current.

A flow converter ledge according to the invention is not limited to the embodiment of a semi-circular rail above the projecting edge of the top as illustrated in the drawing. It is possible to use, without exceeding the scope of the invention, flow converter ledges having other profiles, preferably forwardly concave profiles and to arrange them at an appropriate distance from the top of the vehicle in such a manner that the lower partial stream, corresponding to stream 6' causes a substantially laminar flow along the top.

What is claimed is:

1. In a vehicle having a roof structure projecting forwardly above a windshield, a device for lifting air eddies, which are caused by the roof projection, from the top surface of the roof, said device comprising a deflector spaced above the uppermost surface of the roof projection and having a concave front surface, said deflector having its concave front surface inclined downwardly with the upper edge thereof being positioned forwardly of the lower edge thereof and with said lower edge being spaced a relatively small distance rearwardly of the front end of the roof projection whereby at least a portion of the air caught by the concave front surface is reflected and conducted as laminar flow beneath the eddies produced by the roof projection and directly to the uppermost surface of the roof projection and thence rearwardly between the lower ledge of the deflector and the roof and then above the roof.

2. A device according to claim 1, wherein the distance of the deflector from the uppermost surface of the roof projection is greater than the breadth of the concave front surface of the deflector.

3. In a vehicle having a roof structure projecting forwardly above a windshield, and a sliding roof opening spaced behind the roof projection, a device for lifting the air eddies caused by the roof projection above the top surface of the roof and for deflecting these eddies from the sliding roof opening, said device comprising a deflector spaced above the uppermost surface of the roof projection and positioned in front of the roof opening and having a concave front surface, said deflector being positioned with said concave front surface inclined downwardly with the upper edge thereof arranged forwardly of the lower edge thereof and with said lower edge spaced rearwardly of the front end of the roof projection by a relatively small distance whereby at least a portion of the air caught by the concave front surface is reflected and conducted as laminar flow beneath the eddies produced by the roof projection and directly to the uppermost surface of the roof projection and thence rearwardly between the lower ledge of the deflector and the roof and then above the roof and the roof opening.

4. A device according to claim 3, wherein the concave front surface of the deflector ledge has a partially cylindrical shape, the uppermost edge of the partially cylindrical front surface of the deflector being spaced forwardly of a vertical plane containing the front end of the roof projection and being spaced above a horizontal plane containing the cylinder axis, the lower edge of the partially cylindrical front surface of the deflector ledge being spaced rearwardly of the vertical plane containing the front end of the roof projection and being spaced below the horizontal plane containing the cylinder axis.

5. A device according to claim 4, wherein the cylinder axis is spaced a relatively small distance before the vertical plane containing the front end of the roof projection.

6. A device according to claim 3 wherein the concave front surface of the deflector ledge has an approximately semi-cylindrical shape, a plane containing both edges of this front surface being forwardly inclined by at least 45° with respect to the vertical.

7. A device according to claim 3, wherein the deflector is spaced with its lower edge above the uppermost surface of the roof projection, said projection having a length about three times the radius of curvature of the concave front surface of the deflector.

References Cited in the file of this patent

UNITED STATES PATENTS

| | | |
|---|---|---|
| 2,028,542 | Gluhareff | Jan. 31, 1936 |

FOREIGN PATENTS

| | | |
|---|---|---|
| 1,096,162 | France | Dec. 29, 1954 |
| 1,008,592 | Germany | May 16, 1957 |
| 434,728 | Great Britain | Sept. 9, 1935 |
| 471,342 | Great Britain | Sept. 2, 1937 |
| 747,081 | Great Britain | Mar. 28, 1956 |